US008166777B2

(12) United States Patent
Meinhardt et al.

(10) Patent No.: US 8,166,777 B2
(45) Date of Patent: May 1, 2012

(54) GLASS COMPOSITION AND PROCESS FOR SEALING VOID SPACES IN ELECTROCHEMICAL DEVICES

(75) Inventors: Kerry D. Meinhardt, Richland, WA (US); Brent W. Kirby, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 38 days.

(21) Appl. No.: 12/729,096

(22) Filed: Mar. 22, 2010

(65) Prior Publication Data

US 2011/0226017 A1    Sep. 22, 2011

(51) Int. Cl.
*H01M 2/08* (2006.01)

(52) U.S. Cl. .......... 65/17.3; 429/509; 429/468; 429/469

(58) Field of Classification Search .................. 65/17.3; 429/507–511, 460, 463, 468, 469
See application file for complete search history.

(56) References Cited

U.S. PATENT DOCUMENTS

| 4,011,093 | A * | 3/1977 | Veres ........................... 501/64 |
| 6,430,966 | B1 * | 8/2002 | Meinhardt et al. .............. 65/43 |
| 6,828,263 | B2 * | 12/2004 | Larsen et al. .................. 501/15 |
| 7,419,731 | B2 | 9/2008 | Manning et al. |
| 2009/0197135 | A1 | 8/2009 | Querel et al. |
| 2009/0253017 | A1 * | 10/2009 | Larsen et al. .................. 429/33 |

FOREIGN PATENT DOCUMENTS

| EP | 0835228 A1 | 4/1998 |
| EP | 2109173 A2 | 10/2009 |
| GB | 1431073 A | 4/1976 |
| JP | 07144935 | * 6/1995 |
| JP | 7144935 A | 6/1995 |
| JP | 07144935 A | 6/1995 |

OTHER PUBLICATIONS

JP 07-144935 (Machine Translation) [online], [retrieved on Aug. 17, 2011], retrieved from PAJ Database (http://www19.ipdl.inpit.go.jp/PA1/cgi-bin/PA1INDEX).*
International Search Report/Written Opinion for International Application No. PCT/US2011/020303, Mailing Date Apr. 29, 2011.

* cited by examiner

*Primary Examiner* — Matthew Daniels
*Assistant Examiner* — Yana Belyaev
(74) *Attorney, Agent, or Firm* — James D. Matheson (57) ABSTRACT

A glass foaming material and method are disclosed for filling void spaces in electrochemical devices. The glass material includes a reagent that foams at a temperature above the softening point of the glass. Expansion of the glass fills void spaces including by-pass and tolerance channels of electrochemical devices. In addition, cassette to cassette seals can also be formed while channels and other void spaces are filled, reducing the number of processing steps needed.

19 Claims, 2 Drawing Sheets

GLASS COMPOSITION AND PROCESS FOR SEALING VOID SPACES IN ELECTROCHEMICAL DEVICES

This invention was made with Government support under Contract DE-AC05-76RLO1830 awarded by the U.S. Department of Energy. The Government has certain rights in the invention.

FIELD OF THE INVENTION

The present invention relates generally to glass compositions, and more particularly to foaming glass compositions and processes for making same.

BACKGROUND OF THE INVENTION

Solid oxide fuel cell (SOFC) devices are known and used for the direct production of electricity from standard fuel materials including fossil fuels, hydrogen, and the like by converting chemical energy of a fuel into electrical energy. Fuel cells typically include porous electrode components that are compiled as stacks for conversion of fuels. In a typical SOFC, a solid electrolyte separates the porous metal-based anode from a porous metal or ceramic cathode. Conditioning of solid oxide fuel cells (SOFCs) typically requires a thermal break-in period at a suitable operating temperature in order to integrate components in the SOFC stack. Moreover, it is often desirable or necessary to use a series of thermal treatments to fully assembly a fuel cell. Planar SOFC stacks that operate at an intermediate temperature (700-800° C.), often contain interconnects made of ferritic stainless steels that are hermitically sealed to adjacent components by a sealing glass. Seal performance relies on the chemical compatibility of the sealing glass with the metallic interconnect. During thermal curing, however, glass-containing seals used to couple components within an SOFC stack can shrink. Shrinkage in glass seals used to couple various components can introduce unintentional void spaces, flow paths, gaps, and/or channels within the device that permit undesired consequences to occur including, e.g., unintentional, or redirected, flow of fuel into these void spaces and channels during operation, which reduces the efficiency of the device and can induce associated reductions in output voltages and utility of the device as a power generator. Such gaps and low pressure drop channels (called "by-pass" channels) permit fuel to circumvent the active, or intended, flow path of the cell. For fuel to flow properly within an SOFC, open void spaces including, e.g., channels and pathways must be completed sealed or filled such that they pose a greater energy barrier for circumventing fuels to flow than the desired flow pathways. Thus, ultimately, to have high fuel utilization, such channels must either be filled or eliminated. Accordingly, there is a need for improved methods of filling void spaces during fabrication or coupling of components (e.g., metal and ceramic parts) in an SOFC such that new flow paths or channels are not introduced, so that the SOFCs can operate at high temperatures at maximum fuel efficiency.

SUMMARY OF THE INVENTION

The present invention is a glass-sealing composition and process for filling and sealing void spaces in electrochemical devices. The glass-sealing composition includes a preselected glass material configured with a suitable quantity of a gas-releasing (foaming) agent mixed therein. The gas-releasing (foaming) agent releases a gas at or above the softening temperature of the glass that expands the volume of the glass. When introduced into a void space, when heated, the glass expands to fill the void space. Upon crystallization, the expanded glass retains the structure attained during expansion and seals the void space. The process for filling and sealing void spaces in electrochemical devices includes dispensing the selected glass containing a suitable quantity of a gas-releasing (foaming) agent into a void space of an electrochemical device. When the glass containing the gas-releasing agent is heated to a temperature at or above the softening temperature of the glass, the glass mixture releases a gas that expands the glass. Upon crystallization of the glass, the structure of the glass attained during expansion is retained, thereby filling the void space in the electrochemical device. The process for filling and forming a seal in a void space of a preselected component of an electrochemical device includes mixing a preselected glass material with a quantity of a foaming agent in the range from about 1% to about 10% by weight to form a glass-sealing mixture. The glass-sealing mixture is applied in the void space of the component to be sealed. Next, the component is heated at a preselected temperature to invoke release of a gas from the gas-releasing (foaming) agent that expands the glass material into the void space of the component to form a seal within the component, thereby sealing the void space of the electrochemical component. Suitable glass materials include e.g., sealing glasses; passivation glasses; crystallizing glasses; vitreous glasses; devitrifying (crystallizing) glasses; encapsulation glasses; silicate glasses; (Ba—Al—$SiO_2$) glasses; G-18 glasses; including combinations of these glass materials. Softening temperature for the selected glass is preferably at least about 650° C. Crystallization temperature for the glass is above about 1100° C. In a preferred embodiment, the glass-sealing composition includes a barium calcium aluminosilicate glass, e.g., G-18 glass. The quantity of gas-releasing (foaming) agent introduced in the selected glass is up to about 15% by weight. In another embodiment, quantity of gas-releasing (foaming) agent in the glass is from about 1% to about 8% by weight. In another embodiment, quantity of gas-releasing (foaming) agent in the glass is from about 3% to about 5% by weight. In a preferred embodiment, the gas-releasing (foaming) agent is strontium carbonate ($SrCO_3$). In other embodiments, other carbon dioxide ($CO_2$)-releasing agents can be used. Metal carbonates such as calcium carbonate ($CaCO_3$), barium carbonate ($BaCO_3$) or powdered carbon are exemplary, but not limiting. In addition, oxygen-releasing agents such as barium peroxide ($BaO_2$) can also be used in conjunction with the invention. Foaming agents are selected that: 1) release gas at a temperature when the glass composition is sufficiently soft, and 2) minimize adverse chemical reactions that can alter the glass.

Decomposition (gas releasing) temperature for the gas-releasing (foaming) agent is preferably from about 650° C. to about 850° C. In one embodiment, heating can include a heating rate of from about 0.1° C./min to about 8° C./min. In one embodiment, the dispensing of the glass includes dispensing the glass at a thickness of greater than or equal to about 700 μm. In another embodiment, the electrochemical device is a solid oxide fuel cell (SOFC), or a component thereof. In another embodiment, the void space is a tolerance channel of a solid oxide fuel cell (SOFC). In another embodiment, the void space is a by-pass channel of a solid oxide fuel cell.

The purpose of the foregoing abstract is to enable the United States Patent and Trademark Office and the public generally, especially scientists, engineers, and practitioners in the art who are not familiar with patent or legal terms or phraseology, to determine quickly from a cursory inspection the nature and essence of the technical disclosure of the application. The abstract is neither intended to define the invention, which is measured by the claims, nor is it intended to be limiting as to the scope of the invention in any way. Various advantages and novel features of the present invention are described herein and will become readily apparent to those skilled in this art from the following detailed description. Only the preferred embodiment of the invention is shown and described to illustrate the best mode contemplated for carrying out the invention. As will be realized, the invention is capable of modification in various respects without departing from the invention. Accordingly, the drawings and description of the preferred embodiment set forth hereafter are to be regarded as illustrative in nature, not as restrictive.

DETAILED DESCRIPTION OF THE INVENTION

The present invention includes a new foaming glass composition and process for filling and sealing void spaces including, e.g., flow paths and channels, in electrochemical devices including solid oxide electrolyte electrochemical devices; solid oxide fuel cells (SOFCs); as well as anodes, electrodes, and components of SOFCs; electrolyzers; electrochemical sensors, and like devices and applications. The invention addresses a primary problem that results from the shrinking of glass seals and sealing components during curing. Such flow paths and channels in a device allow, e.g., fuel to flow in these unintended flow paths in the device, decreasing fuel efficiency and/or fuel utilization of the device. The invention also addresses material property mismatches between coupled components that have, e.g., mismatches in thermal expansion coefficients that can result in unintended flow paths and channels being introduced in an electrochemical device. For example, in a planar configuration described hereafter, shrinking that occurs during curing of glass components during thermal conditioning can introduce new and unintended void spaces into the device. Such problems are most noticeable and readily detectable, though not limited to, shrinking that occurs during curing and cooling of SOFCs at high temperatures. Thus, while the invention is described herein in reference to solid oxide fuel cells (SOFC) and advantageous features and characteristics of the invention are demonstrated in relation to SOFC technology, it should be understood that uses of the invention are not limited solely to SOFC devices.

For the purpose of promoting an understanding of the invention, reference will made to the embodiments illustrated in the drawings and specific language will be used to describe the same. It will nevertheless be understood that no limitation of the scope of the invention is hereby intended. Alterations and further modifications in the illustrated devices, and such further applications of the principles of the invention as illustrated herein are contemplated as would normally occur to one skilled in the art to which the invention relates. Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

Figure 1:
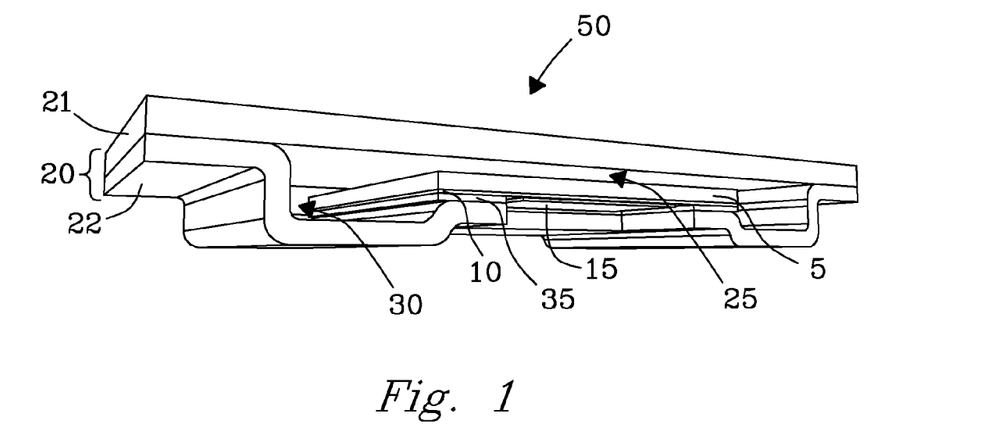
FIG. 1 shows a single solid oxide fuel cell element that can be filled and sealed in accordance with the invention.

FIG. 1 shows a single solid oxide fuel cell device (cassette) 50 that includes a frame 20 (e.g., steel) into which various device components are introduced for operation, including, e.g., an anode 5, an electrolyte layer 10, and a cathode 15. For ease of construction, frame 20 includes, e.g., a separator (upper) plate 21, and a lower plate 22 that are welded together to form frame 20. A (non-foaming) glass seal 35 mates lower plate 22 to the cathode side of device 50. This glass seal design prevents electrical shorting of the fuel cell device 50 against steel frame 20 when fuel cell device 50 is introduced into a stack (not shown) of such devices, but is not limited thereto. Device 50 includes a fuel gap 25 where fuel (e.g., CO, $H_2$, and/or other preselected gases) is first introduced into SOFC assembly 50. In the figure, SOFC device 50 also includes a void space 30. The term "void space" as used herein means any location or flow path in a device that is assessed by a user to reduce operating efficiency of the device and is deemed to require sealing or filling in order to correct. The illustrated void space is intended to be representative of all void spaces in high-temperature and electrochemical devices that can be sealed and/or filled in conjunction with the invention. Void spaces include, but are not limited to, e.g., channels (e.g., tolerance channels, bypass channels), gaps, ducts, manifolds, and like structures that conduct constituents (e.g., gases, oxidants, and other flowing or gaseous constituents) away from an intended flow path into, or out of, device 50. As an example, "bypass channels" and "tolerance channels" can form in SOFCs, allowing a fuel or a fuel constituent to bypass the actual or intended flow path of the device, resulting in a reduction in fuel efficiency. Void spaces 30 can form in SOFC devices 50 by improper contact between components, e.g., between cathode 15 and steel frame (plate) 20 on the cathode side of device 50. In the figure, void space 30 includes the undercarriage (interior surface) of lower plate 22 of steel frame 20 that extends along the outer boundary adjacent to anode 5, electrolyte layer 10, and cathode 15. In the figure, void space 30 has a location and orientation in the same direction as the flow of fuel in device 50, but void spaces are not limited thereto as will be understood by the person of ordinary skill in the art. In the figure, void space 30 is shown needing filling and sealing in conjunction with the invention.

Solid-oxide fuel cells (SOFCs) can be constructed in a wide variety of configurations as will be understood by persons of ordinary skill in the art, including, but not limited to, e.g., planar fuel cells, tubular fuel cells, corrugated fuel cells, and other fuel cells designs. In planar SOFC designs, electrochemical cells are typically positioned adjacent one another in series, or atop another in a stack. Stacks of planar SOFCs can include repeating units of cathodes, electrodes, and anodes with electrical interconnects positioned between the cathode and the anode of adjacent cells. No limitations are intended. While a single SOFC element is described herein, all uses of the invention in concert with high temperature devices and electrochemical devices, including, e.g., SOFCs, as well as their various configurations and designs, in view of the disclosure are within the scope of the invention.

The foaming glass composition and method of the invention for filling void spaces will now be described.

Types of Glass

Glasses suitable for use in conjunction with the invention for filling and sealing void spaces include, but are not limited to, e.g., sealing glasses; passivation glasses; crystallizing glasses; vitreous glasses; devitrifying (crystallizing) glasses; encapsulation glasses; silicate glasses; and combinations of these glass compositions. Silicate glasses include, but are not limited to, e.g., aluminosilicate glasses; borosilicate glasses; and combinations of these glasses. Exemplary aluminosilicate glasses include, e.g., calcium aluminosilicate glasses, barium aluminosilicate glasses, barium calcium aluminosilicate glasses, and other metal- and metal oxide-based aluminosilicate glasses. Glasses are selected to provide optimum compatibility with the device requirements and usage, as well as the application technique used to apply it. Critical characteristics of glasses include: the type of glass; and the Coefficient of Thermal Expansion (CTE) at the glass set point (CTE @ Set Point). The CTE @ Set Point is selected to be as close as possible to the substrate material to prevent stress between the glass component and the substrate that can lead to cracking and failure. The term "matched fit" defined between an electrochemical or high-temperature substrate and the glass selected for filling and sealing void spaces in the electrochemical or high-temperature device specifies the largest maximum difference recommended between the selected glass component and the selected substrate of plus or minus (±) about 10%. For electrochemical devices, the selected glass must be non-reactive with other device components at the selected operating temperature, and must further have a closely matched coefficient of thermal expansion (CTE), as described herein.

In some situations, a "compression fit" can allow joining of two dissimilar materials having different thermal expansions in combination in combination with use of an intermediate glass. Glasses may also be a composite of several different glasses, or can further include glass and ceramic fillers, binders, dispersants, and other associated constituents. Composite glasses can often meet or address specific properties or condition requirements, such as thermal expansion and firing temperature that may not be achievable with a single glass.

Glasses include vitreous and devitrifying (crystallizing) type glasses. Vitreous glasses are thermoplastic and flow at the same temperature each time they are fired. Devitrifying glasses are thermosetting and crystallize during firing to form glass-ceramics, which have different properties than the original glass. Crystallization and glass-ceramic composites can be modified by changing firing conditions and particle size distributions. These composites typically have greater strength and allow higher device operating temperatures than vitreous forms.

A preferred and exemplary glass used and described herein in conjunction with the invention is a barium calcium aluminosilicate glass, also known as G-18 glass, available commercially (Viox Corp., Seattle, Wash., USA). G-18 glass has been detailed, e.g., by Meinhardt et al. in U.S. Pat. No. 6,430,966, which reference is incorporated herein in its entirety. G-18 glass includes the following mixture of oxides (weight percent basis): 56.4% BaO, 22.1% $SiO_2$, 5.4% $Al_2O_3$, 8.8% CaO, and 7.3% $B_2O_3$. While G-18 glass is used and described herein in conjunction with the invention, the invention is not limited thereto. For example, many varied glasses can be used in conjunction with the invention with appropriate foaming constituents as described herein. Thus, the invention is not intended to be limited to the exemplary glass described.

Glass Transition Temperature

The term "Glass Transition Temperature" ($T_g$) (also known as "Vitrifying Temperature") refers to the temperature below which an amorphous material forms a glassy solid, and above which the amorphous material forms a viscous liquid. The "glass transition" is a dynamic phenomenon occurring between two distinct states of matter, liquid and glass, each having different physical properties. Each glass choice has a maximum suitable operating temperature. This means that a device that incorporates a selected glass will also have a maximum operating temperature to which the device can be operated without degrading the glass. Exceeding the maximum operating temperature can lead to device failure. The maximum operating temperature is typically lower than the glass transition temperature value, ($T_g$), of the glass. After firing, a devitrifying glass such as G-18 described herein, will have a maximum operating temperature that is higher, sometimes significantly higher, than the original glass. That is, the devitrifying glass can allow operation above the ($T_g$) for the pure state glass. This increase in operating temperature is dependent on the crystalline phase that is formed.

Glass flow and wettability are determined at the time and conditions of processing for quality control purposes at a selected processing temperature. For example, in some cases, a glass composition selected for use will not be compatible with a particular substrate at the operating temperature. Thus, the substrate will adversely react with the selected glass component at the operating temperature. Sufficient bond strength between the glass and the substrate surface layers is required. Bond strengths can be assessed by testing mechanical strength of, e.g., the glass seals.

Particle Size

Particle size distribution (PSD) or powder type, as expressed in maximum ($D_{99}$) and average ($D_{50}$) particle sizes, should only be as small as necessary to achieve the desired fired thickness and line definition using the application technique chosen. The smaller a powder type is, typically, the more difficult to process efficiently. In the case of devitrifying glasses (crystallization during firing), changes in the PSD can affect fired CTE, flow and wetting, densification and strength. The selected glass used in conjunction with the invention is preferably ground to a powder. The powder is preferably composed of glass particles of a preselected, uniform particle size. Particle sizes can be varied depending on the intended application in the range from about 1 μm to about 40 μm. In a preferred embodiment, glass (G-18 glass) particles have an exemplary particle size of about ~20 μm, but are not limited thereto. For example, particle size can be adjusted to fine tune the structure of the foaming glass composition. Thus, no limitations are intended.

Gas-Releasing (Foaming) Agents

Gas-releasing (foaming) agents suitable for use in conjunction with the invention include, but are not limited to, e.g., $SrCO_3$; $CaCO_3$, $BaO_2$, powdered carbon, and combinations of these foaming agents. In the preferred embodiment, the gas-releasing (foaming) agent is strontium carbonate ($SrCO_3$). Quantity of the selected gas-releasing (foaming) agent introduced into the glass composition is up to about 15% by weight. In other embodiments, quantity of the gas-releasing (foaming) agent is from about 1% to about 8% by weight in the glass. In yet other embodiments, quantity of the gas-releasing (foaming) agent is from about 3% to about 5% by weight in the selected glass. No limitations are intended.

Decomposition (Foaming) Temperature

Decomposition temperature for the gas-releasing (foaming) agent is preferably from about 650° C. to about 850° C.

The decomposition temperature is defined by the softening point of the selected glass. The glass must begin to soften at a temperature below the release temperature of the gas-releasing agent so that the gas released from the gas-releasing agent is retained within the softened or melted glass such that the volume of the glass expands to fill the void space to which it is introduced. Suitable glass compositions will include a crystallization temperature that falls above the softening or melting temperature of the glass and that is above the gas-release temperature of the gas-releasing (foaming) agent. The coincidence of the softening point temperature, the gas-release (decomposition) temperature and the crystallization temperature ensure that the volume of the glass attained to during expansion is retained by the expanded glass upon crystallization and 2) that the expanded glass fills and seals the void spaces to which it is introduced.

Method for Preparing Glass Composition

In the preferred embodiment, milled glass particles and gas-releasing (foaming) agent (e.g., strontium carbonate, $SrCO_3$) are mixed in powdered form together with a polyvinyl butyral (PVB)-based resin (e.g., Catalog #: BD-75717, Ferro Electronics Materials, Cleveland, Ohio, USA) that provides for wet buildup of glass materials forming a paste with a preselected viscosity. The preferred PVB resin includes a solvent (e.g., carbitol acetate), 20.9% (PVB) binder solids, a (1.7:1) resin to plasticizer ratio, yielding a specific gravity of solvent to solids of (0.87:1). The glass paste is mixed to homogenize the viscous components preferably using a three-roll mill as will be understood by the person of ordinary skill in the mixing art, but methods for mixing are not limited. Material properties of the preferred glass (e.g., G-18) paste are listed in TABLE 1.

TABLE 1

| Material Properties of G-18 Glass-containing Paste. | |
|---|---|
| Percent (%) $SrCO_3$ in G-18 glass | 4.0 |
| Theoretical Density of Pure G-18 glass (g/mL) | 3.98 |
| Measured Density of Pure G-18 under test conditions (g/mL) | 2.97 |
| Mass of Paste (g) | 1.55 |
| Glass, Unfoamed Volume (mL) | 0.375 |
| Glass, Measured Foamed Volume (mL) | 1.403 |
| Foam Growth Factor (FGF) | 3.74 |

In the Table, $SrCO_3$ content vs. total solids is reported. A typical glass paste composition has a weight loading of about 65% solids (G-18 glass plus $SrCO_3$) and 35% PVB-resin by weight. Thus, a 4.0% $SrCO_3$ formulation by weight represents 2.6% by weight $SrCO_3$ in the wet paste (i.e., 4.0×0.65). Overall solids loading is selected so as to give a suitable viscosity range for milling or dispensing of the paste. Viscosity is preferably selected in the range from about 500 cP (centipoise) to about 4,000 cP. More particularly, viscosity is selected in the range from about 1,000 cP to about 4,000 cP. Most particularly, viscosity is selected in the range from about 2,500 cP to about 4,000 cP.

Solvents, Dispersants

Various solvents can be used in conjunction with the invention composition and process to achieve desired solubility of selected glasses, foaming agents, dispersants, and other associated constituents included in the glass composition. Thus, no limitations are intended. Solvents include, but are not limited to, e.g., butanol, toluene, methyl ethyl ketone (MEK).

A preferred dispersant in the paste solids is, e.g., ammonium polyacrylate, but is not limited thereto. Binders include, but are not limited to, e.g., cellulose, latex, PVB, as well as combinations of these binders. All constituents as will be selected by those of ordinary skill in the art in view of the disclosure are within the scope of the invention. No limitations are intended.

Glass Forms

The glass composition can take various forms including, but not limited to, e.g., paste forms, pelletized forms, shaped forms, liquid forms, or other forms that allow introduction of the glass composition into selected void spaces, channels, gaps, and other diversion flow paths of, e.g., electrochemical devices and other high temperature devices, including application to various substrates and surfaces, e.g., as described herein. Viscosity of the composition is selected and prepared depending on how the glass composition is to be applied.

Applying the Glass Forms

The glass composition can take different various forms that allow the composition to be introduced into void spaces of high-temperature devices for filling and sealing. Forms of the glass composition include, but are not limited to: 1) liquids; 2) pellets and other shaped forms; 3) pastes; and 4) other surface forms. In one embodiment, the glass composition can be introduced into a void space as a freely flowing liquid. In another embodiment, the glass composition can be introduced into a void space as a pellet or other shaped form (e.g., spheres) of dried paste. For example, the foaming glass composition can be injection molded into various solid shapes including, e.g., pellets and spheres. Pellet and shaped forms can be prepared with the same glass composition or different glass compositions. No limitations are intended. Once the glass is fired, binders and other constituents of the composition burn away, leaving the structure behind that is formed during the foaming process that expands the glass. Thus, the final structure of the expanded glass is only dependent upon the ratio of glass to foaming agent (glass:foaming agent). In yet other embodiments, the glass composition can be applied to a surface directly, e.g., as a bead of paste to a surface.

Foam Growth Factor

Glass Expansion Ratio

The foam growth factor (FGF) value, that defines the glass expansion volume, is given by Equation [1], as follows:

$$FGF = \frac{\text{Glass, Final Foam Volume (mL)}}{\text{Glass, Unfoamed Volume (mL)}} \quad [1]$$

Figure 2:
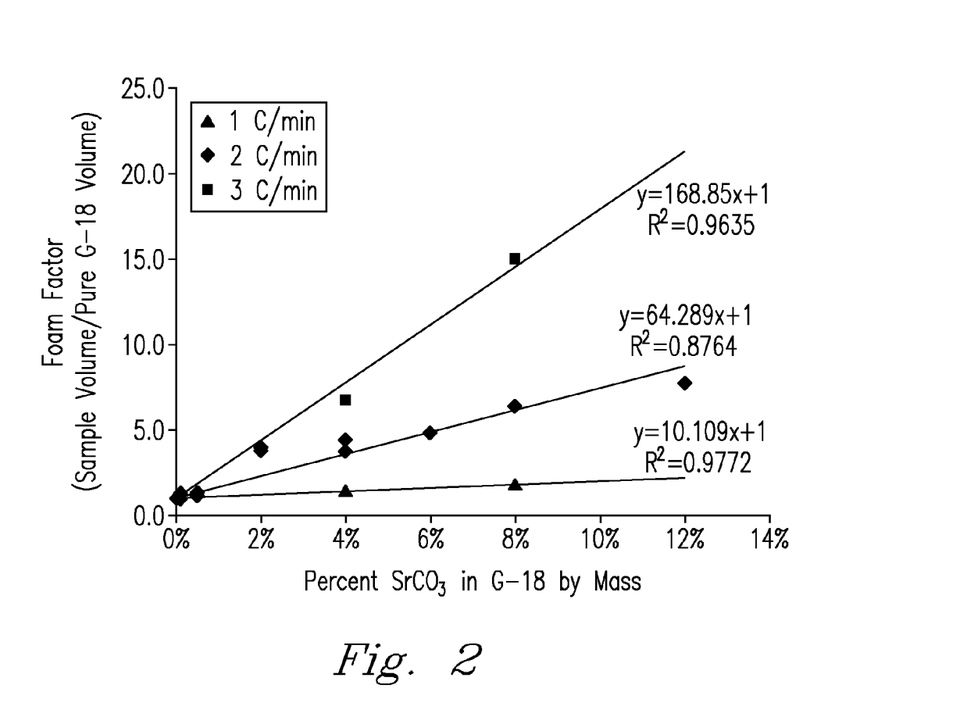
FIG. 2 shows expansion volume data as a function of heating rate for an exemplary glass filling and sealing composition, according to one embodiment of the invention.

Here, FGF is defined as the ratio of the final foamed volume to the volume the same mass of paste would produce with no foaming agent added, i.e., the glass unfoamed volume. A foam growth factor value of 3 for the glass composition means the final volume of the glass is three times greater than the volume that is otherwise expected in the absence of a foaming constituent. While an FGF value of 3 is described, the value is exemplary only; it should be distinctly understood that the invention is not to be limited in any way to the exemplary FGF value. For example, numerous FGF values can be used in conjunction with the invention described herein, as will be understood by those of ordinary skill in the art. Thus, no limitations are intended. FIG. 2 plots FGF (glass expansion volume) data for an exemplary foaming glass composition containing G-18 glass as a function of the foaming constituent (e.g., $SrCO_3$). Results show a linear increase in FGF with increasing $SrCO_3$ content.

Heating Rate

Heating rate has been shown to affect the FGF values achieved for foaming glass compositions of the invention. Preferred heating rate temperatures depend in part on the gas-release temperature of the gas-releasing (foaming) constituent introduced to, and contained within, the glass composition. In particular, heating rates are selected that yield a soft glass (i.e., at a suitable glass transition temperature) at the selected gas release temperature of the foaming constituent so as to fully expand the soft glass during gas release. TABLE 2 presents Growth Factor and Heating Rate data for the exemplary foaming glass composition containing G-18 glass as a function of the foaming constituent ($SrCO_3$). FIG. 2 shows these FGF data at the selected heating rates of 1° C./min, 2° C./min, and 3° C./min, respectively.

TABLE 2

Foam Growth Factor and Heating Rate data for an exemplary and representative foaming glass paste containing G-18 glass.
FOAM GROWTH FACTOR VALUES

| $SrCO_3$ Content | Heating Rate | | |
|---|---|---|---|
| | 1° C./min | 2° C./min | 3° C./min |
| 0.0% | — | 1.00 | — |
| 0.1% | — | 0.99; 1.30 | — |
| 0.5% | — | 1.16; 1.34 | — |
| 2.0% | — | 3.96; 3.80 | — |
| 4.0% | 1.44 | 3.74; 4.42 | 6.76 |
| 6.0% | — | 4.81 | — |
| 8.0% | 1.79 | 6.37 | 15.01 |
| 12.0% | — | 7.72 | — |

As shown in the table, and confirmed in FIG. 2, faster heating rates lead to enhanced foam growth factor values (and thus greater glass expansion volumes) when the foaming component releases gas into the glass. The greater expansion volume is attributed to a reduction in the crystallization of the glass that yields a "softer" glass. In the exemplary embodiment, proper expansion of the foaming glass composition containing G-18 glass is controlled by heating the glass composition at a rate from about 0.1° C./min to about 8° C./min. Release of gas prior to the glass transition temperature, or after the transition temperature can reduce the foam growth factor values that expand the glass. Expansion of other glasses can be similarly controlled in view of the invention disclosure as will be understood by those of ordinary skill in the glass arts. No limitations are intended. For example, results show that heating rate is another parameter that can be controlled for specific applications, e.g., for filling and sealing of void spaces in high temperature devices.

Quantity of Glass for Void Space Filling and Sealing

The quantity of the foaming glass composition needed to fill and seal a void space (e.g., channels, gaps, etc.) or a diversion flow path in a device is based on the final expansion volume of the glass in the device. The final volume of the expanded glass needed for filling and sealing in turn depends on the expected foam growth factor (FGF) (glass expansion) value of the glass composition and the mass of glass applied. The relationship is defined by Equation [2], as follows:

$$\text{Final Foamed Glass Volume (mL)} = \frac{[\text{Mass of Glass (g)}] \times [FGF]}{\left[\text{Density of Pure Glass}\left(\frac{g}{mL}\right)\right]} \quad [2]$$

Glass Forms

The glass composition can take various forms that allow the composition to be introduced into void spaces for ultimate filling and sealing in, e.g., electrochemical devices and other high temperature devices. Forms include, but are not limited to, e.g., paste forms, solid forms, shaped forms (e.g., spheres, discs), pelletized forms (e.g., particles, granules), liquid forms, and other glass forms as will be known and understood in the art. Viscosity of paste and liquid forms is selected for purposes of dispensing, introducing, and applying the glass composition, as described further herein.

Applying Glass Compositions for Filling an Sealing of Void Spaces

Glass compositions of the invention can be uniformly dispensed into void spaces (e.g., channels or other flow paths) to fill and seal locations on various surfaces and components of electrochemical and other devices. The glass composition can be dispensed, e.g., using a pressurized dispensing tool (e.g., a Performus III dispensing tool, Engineered Fluid Dispensing, Inc., East Providence, R.I., USA) mounted to an automated dispensing robot (e.g., a Janome JR2000N dispensing robot, Janome Industrial Equipment Inc Elk Grove Village, Ill., USA). The dispensing tool delivers the glass composition in a paste form from, e.g., a 10-cc syringe of the dispensing device at a dispensing pressure of up to 100 psi (6.9 bar), but is not intended to be limiting. The syringe is fitted with a tip with a small opening from about 200 μm to about 1200 μm. An exemplary and preferred size of the delivery orifice of the syringe was 400 μm, but is not limited thereto. Size of the delivery orifice will depend in part on the size of the void space to fill as well as the thickness of the glass paste to deliver, as described further herein. The robot dispenses the paste as the syringe moves in a pre-programmed path across the surface of the selected component, which permits uniform coatings or thicknesses of the glass composition to be applied into the void surface or on a surface of a selected component.

Filling with Paste Forms

As an example of filling void spaces with a paste form of the glass composition, in order to fill a void space having dimensions: 10 (cm)×1 (cm)×0.1 (cm) having a total volume of 1 $cm^3$, a ribbon of glass paste having a total mass of 1.52 g, 65% solids loading, a foam growth factor of 3, and approximate dimensions of 10 (cm)×0.51 (cm)×0.10 (cm) can be used to fill and seal the void space volume. Alternatively, to fill a cubic void space of 1 $cm^3$, the same paste mass of 1.52 g can take the dimensions of: 1 (cm)×1 (cm)×0.51 (cm).

Filling with Pellet and Shaped Forms

In another exemplary case of filling void spaces, an injection-molded pellet of the foaming glass composition having dimensions: 1 (cm)×1 (cm)×0.51 (cm) can be placed in a void space having a void space volume of ~1 $cm^3$. In another exemplary case, the void space volume (i.e., 1 cm³) can be filled and sealed by filling the void space prior to heating and expansion with 1-mm diameter spheres of the dried glass paste, loosely packing the void space with the spheres, that then expand upon heating to fill and seal the void space.

Filling with Liquid Forms

In another exemplary case, the foaming glass composition is dissolved or mixed in a low viscosity carrier yielding a liquid form of the foaming glass composition. The quantity of solvent depends on the viscosity needed to penetrate and fill the void space. The liquid form of the glass composition can then be used to fill otherwise inaccessible void spaces, e.g., by flow-induction (e.g., gravity or suction). Once filled, the void space can then be sealed by heating to expand the glass composition.

Thermal Conditioning of the Glass Seal

Figure 3:
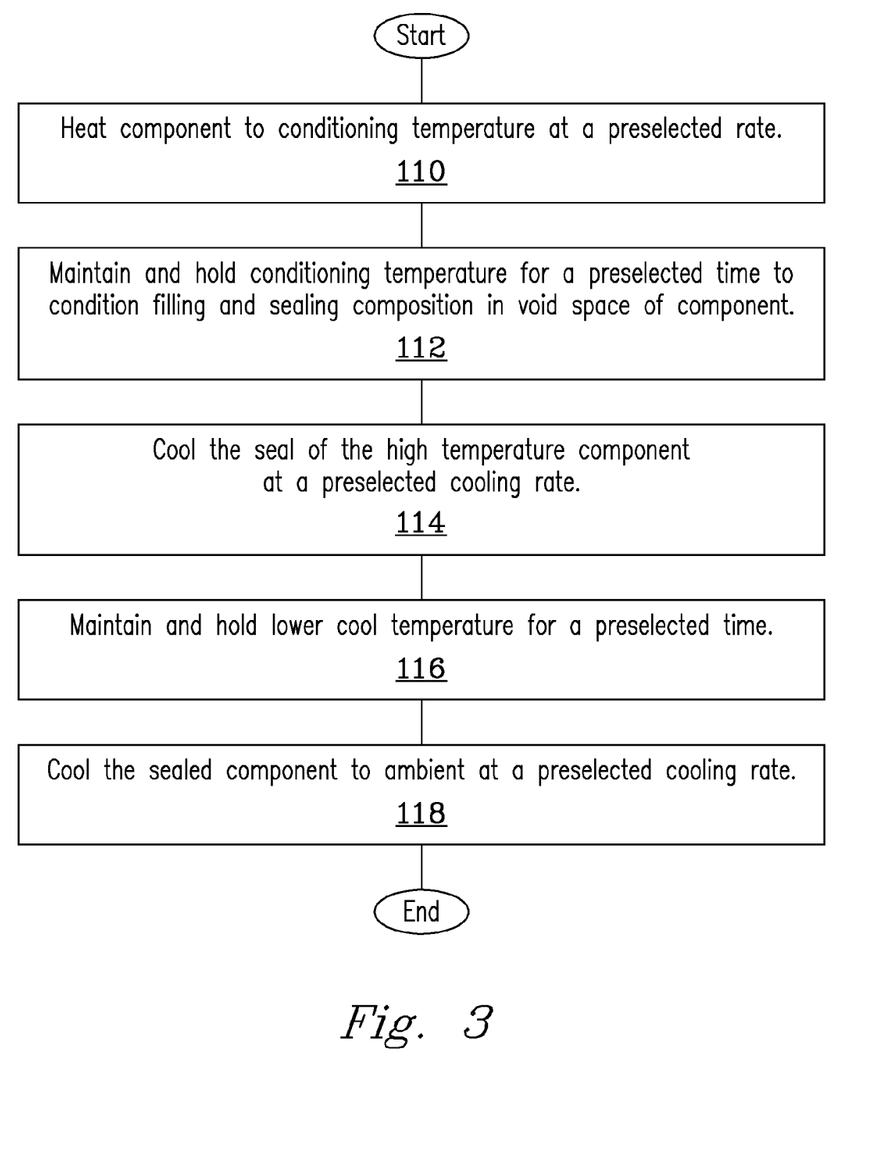
FIG. 3 is an exemplary process for conditioning of a foaming glass seal, according to one embodiment of the process of the invention.

Once the form of the foaming glass composition is applied or otherwise introduced into the selected void space of the device filling the void space. The foaming glass is then expanded to seal the void space in the device. The device is then thermally conditioned by heating or sintering the glass seal. FIG. 3 shows an exemplary thermal conditioning process for conditioning of a fully foamed expansion seal. {START}. In a first step {step 110}, the component is heated from room temperature (e.g., ~20° C.) to a preselected conditioning temperature. In an exemplary embodiment, the condition temperature is about 850° C. and the heating rate is about 2° C./min, but temperatures and heating rates are not limited thereto. In another step {step 112}, the conditioning temperature is held and maintained for a preselected time. In a typical case, hold time is at least about an hour. Next {step 114}, the sealed component is cooled at a preselected cooling rate to a lower (cool temperature) temperature than the condition temperature, over a preselected time. In one embodiment, the lower cool temperature is about 750° C. and the cooling rate is about 5° C./min, but is not intended to be limited thereto. In another step {step 116}, maintain and hold the lower cool temperature for a preselected time. In a typical case, hold time at the lower cool temperature is about four hours. In an option step {step 118 (optional)}, the sealed component is cooled to room temperature (e.g., ~20° C.) at a preselected cooling rate. In a typical case, cooling rate is about 5° C./min, but is not limited thereto. After heat conditioning and treatment, the glass seal expanded within the void space of the selected SOFC component completely fills the void space volume, preventing gas from entering the void space, thereby sealing the void space. {END}.

The following Examples provide a further understanding of the invention.

Example 1

Glass Paste Form

In an exemplary test, a foaming glass paste containing G-18 glass was dispensed at a uniform rate (e.g., 0.075 g/linear cm) into tolerance channels 30 located between a steel frame 20 of a solid oxide fuel cell 50 on the anode side of the device 50 using a pressurized dispensing tool. A consistent bead of glass paste with an approximately hemispherical cross-section was applied, having typical dimensions: 2-mm wide and 1-mm high. Device components were dried in an oven at 80° C. to remove solvent from the paste. A separator plate 21 was welded to a lower plate 22 to form a cassette, covering the bead of dried paste. A stack (not shown) consisting of five cassettes 50 was assembled. Expansion (i.e., foaming) of the foaming glass paste in the tolerance channels 30 to seal the tolerance channels of the devices 50 was achieved concurrently with stacking of the five cassettes 50 together and coupling them together using a conventional, non-foaming glass. Results demonstrated that the foaming glass allowed fuel cell operation to continue preventing unwanted fuel bypass.

CONCLUSIONS

Results have demonstrated that void spaces, channels, and flow paths introduced during high-temperature thermal conditioning and/or operation of electrochemical devices can be sealed using gas-tight seals prepared from glass compositions in accordance with the invention that provide suitable filling of void spaces of these high-temperature electrochemical devices, including SOFCs.

We claim:

1. A method for sealing a void space in a high-temperature electrochemical device, characterized by the steps of:
   introducing a foaming glass composition in a location defining a void space to be filled in at least one member of a high temperature electrochemical device, the foaming glass composition capable of forming a glass foam at a preselected temperature;
   assembling said high temperature electrochemical device with said at least one device member therein; and
   heating said foaming glass composition within said assembled high-temperature electrochemical device at said preselected temperature to form said glass foam filling said void space therein.

2. The method of claim 1, wherein said foaming glass composition includes glass particles of a preselected size, a preselected solvent, a dispersant, and a binder that forms said paste for dispensing of said foaming glass composition into said void space.

3. The method of claim 1, wherein said gas-releasing agent is $SrCO_3$.

4. The method of claim 1, wherein the quantity of said gas-releasing agent in said foaming glass composition is selected in the range from about 1% to about 10% by weight.

5. The method of claim 1, wherein said gas-releasing agent releases gas at a temperature in the range from about 650° C. to about 850° C.

6. The method of claim 1, wherein the step of heating includes a heating rate selected in the range from about 0.1° C./min to about 8° C./min.

7. The method of claim 1, further including the step of crystallizing said glass structure to retain the structure attained during expansion of said glass.

8. The method of claim 7, wherein said crystallized glass includes a melting temperature above about 1100° C.

9. The method of claim 7, wherein the step of crystallizing said glass includes a glass crystallization temperature at least above about 750° C.

10. The method of claim 1, wherein said high temperature electrochemical device is a solid oxide fuel cell (SOFC), or a component thereof.

11. The method of claim 1, wherein said void space is a by-pass channel of a solid oxide fuel cell (SOFC).

12. The method of claim 1, wherein the introducing includes introducing said foaming glass composition in said void space at a thickness greater than or equal to about 700 μm.

13. The method of claim 1, wherein the introducing includes introducing said foaming glass composition in said void space in a form selected from the group consisting of: a paste, a pellet, a shaped pellet, a ball, a disc, a liquid, and combinations thereof.

14. The method of claim 1, wherein the foaming glass composition comprises a G-18 aluminosilicate glass.

15. The method of claim 1, wherein the assembling includes assembling a separator plate to a lower plate forming a cassette that covers the glass paste prior to heating.

16. The method of claim 1, wherein the heating expands the glass foaming composition by a foam growth factor up to about 4.

17. The method of claim 1, wherein the heating expands the glass foaming composition by a foam growth factor greater than 4.

18. The method of claim 1, wherein the glass foaming composition expands by a factor of from 30 percent to 40 percent by volume.

19. The method of claim 1, wherein the glass foam within said void space diverts a gas introduced thereat in said high temperature electrochemical device in a direction having a lower barrier to flow than that of said filled void space.

* * * * *

UNITED STATES PATENT AND TRADEMARK OFFICE
CERTIFICATE OF CORRECTION

PATENT NO. : 8,166,777 B2  
APPLICATION NO. : 12/729096  
DATED : May 1, 2012  
INVENTOR(S) : Kerry D. Meinhardt and Brent W. Kirby Page 1 of 1

It is certified that error appears in the above-identified patent and that said Letters Patent is hereby corrected as shown below:

Col. 10, Line 23: replace "an" with "and"

Signed and Sealed this  
Third Day of July, 2012

David J. Kappos  
*Director of the United States Patent and Trademark Office*